(12) United States Patent
Chen et al.

(10) Patent No.: US 7,330,702 B2
(45) Date of Patent: Feb. 12, 2008

(54) METHOD AND APPARATUS FOR INTER-CHIP WIRELESS COMMUNICATION

(75) Inventors: Ker-Min Chen, Hsinchu (TW); Tsung-Yang Hung, Jhubei (TW)

(73) Assignee: Taiwan Semiconductor Manufacturing Co., Ltd., Hsin Chu (TW)

( * ) Notice: Subject to any disclaimer, the term of this patent is extended or adjusted under 35 U.S.C. 154(b) by 523 days.

(21) Appl. No.: 11/045,050

(22) Filed: Jan. 31, 2005

(65) Prior Publication Data

US 2006/0172719 A1 Aug. 3, 2006

(51) Int. Cl.
*H04B 1/40* (2006.01)
(52) U.S. Cl. .................. 455/73; 455/90.3; 257/725
(58) Field of Classification Search .................. None
See application file for complete search history.

(56) References Cited

U.S. PATENT DOCUMENTS 5,754,948 A    5/1998   Metze
6,263,193 B1   7/2001   Iseki et al.
6,542,720 B1   4/2003   Tandy
6,718,163 B2   4/2004   Tandy

*Primary Examiner*—Thanh Cong Le
(74) *Attorney, Agent, or Firm*—Duane Morris LLP

(57) ABSTRACT

In one embodiment, the disclosure relates to a method and apparatus for inter-chip wireless communication system. The system includes a first microprocessor having a plurality of non-contact ports and a first RF communication circuit integrated with the first microprocessor; a second microprocessor also having a plurality of non-contact ports and a second RF communication circuit integrated therein. An RF communication protocol can be configured to receive data from each of the non-contact ports in parallel, multiplex and translate the data to a serial RF signal. Data communication can be accomplished using the wireless communication circuit on each chip. The RF communication between the first and the second integrated circuits using the communication protocol defines a non capacitive-coupling of the first and the second die.

20 Claims, 2 Drawing Sheets

METHOD AND APPARATUS FOR INTER-CHIP WIRELESS COMMUNICATION

BACKGROUND

Semiconductor device geometries have dramatically decreased in size since such devices were first introduced several decades ago. Since then, integrated circuits have generally followed the two year/half-size rule (often called Moore's Law), which means that the number of devices on a chip doubles every two years. Today's fabrication plants are routinely producing devices having 0.35 μm and even 90 nm feature sizes. Fabrication of electronics devices typically entails designing components defined by a multitude of microelectronic circuits. Using fabrication technology, several microcircuits can be integrated on a single chip to form an integrated circuit ("IC"). The chips communicate with each other through a plurality of nodes or I/O (input/output) ports. As the integrated circuits diminish in size, new challenges arise in packaging the integrated circuit into an electronic device.

Conventionally, microprocessors formed on different semiconductors communicate through their respective I/O pins and through traces formed on a PCB. The traces span the gap between the microprocessors, enabling parallel communication between connected processors. The PCB traces create additional processing steps and quality concerns for the manufacturer. For example, efficient quality control is required to ensure precise placement of the PCB traces between the appropriate chips. Also, the design architecture of the PCB trace has to be optimize in order to avoid current leakage and other physical losses. Finally, since the traces are very thin electrical connections, they can be easily disconnected causing failure of the finished device.

Accordingly, there is a need for an inter-chip communication method that overcomes these and other disadvantages of the prior art.

SUMMARY OF THE DISCLOSURE

In one embodiment, the disclosure relates to a method of communicating between a first integrated circuit formed on a first die and a second integrated circuit formed on a second die, the method includes placing the first die in a microelectronic package adapted to receive an electronic circuit, the first integrated circuit configured with a transmitter/receiver for RF communication; positioning the second die in the microelectronic package proximal to the first, the second integrated circuit configured with a transmitter/receiver for RF communication; programming each of the first and the second die with a communication protocol adapted for inter-die communication; and establishing an RF communication between the first and the second integrated circuits using the communication protocol, wherein the RF communication defines a non capacitive-coupling of the first and the second die.

In another embodiment, the disclosure is directed to an inter-chip communication system comprising a first die having a first microprocessor with a plurality of non-contact ports and a first RF communication circuit integrated therein; a second die having a second microprocessor with a plurality of non-contact ports and a second RF communication circuit integrated therein; and an RF communication protocol adapted to receive data from each of the non-contact ports in parallel and translate the data to serial RF communication signal; wherein the RF communication between the first and the second integrated circuits using the communication protocol defines a non capacitive-coupling of the first and the second die.

In still another embodiment, the disclosure concerns a microprocessor adapted for wireless communication with a second microprocessor in a microelectronic package, comprising a die having embedded thereon a microprocessor circuit, the microprocessor circuit defining at least one electronic circuit having a plurality of I/O ports for parallel communication, the microprocessor circuit void of any external electrical connection other than at least one of power and ground; a communication protocol adapted to collect communication signals from the plurality of I/O ports in parallel and provide a serial signal for wireless transmission; a communication circuit for wireless communication of electrical signals from the microprocessor, the communication circuit configured to transmit the serial signal for wireless communication.

BRIEF DESCRIPTION OF THE DRAWINGS

The disclosure is described with reference to the following non-limiting and exemplary illustrations in which similar elements are numbered similarly and where.

DETAILED DESCRIPTION OF THE DISCLOSURE

The disclosure relates to providing method and apparatus for communication between microelectronic devices within an electronic package. More specifically, the disclosure relates to a method and apparatus for inter-chip wireless communication.

Figure 1:
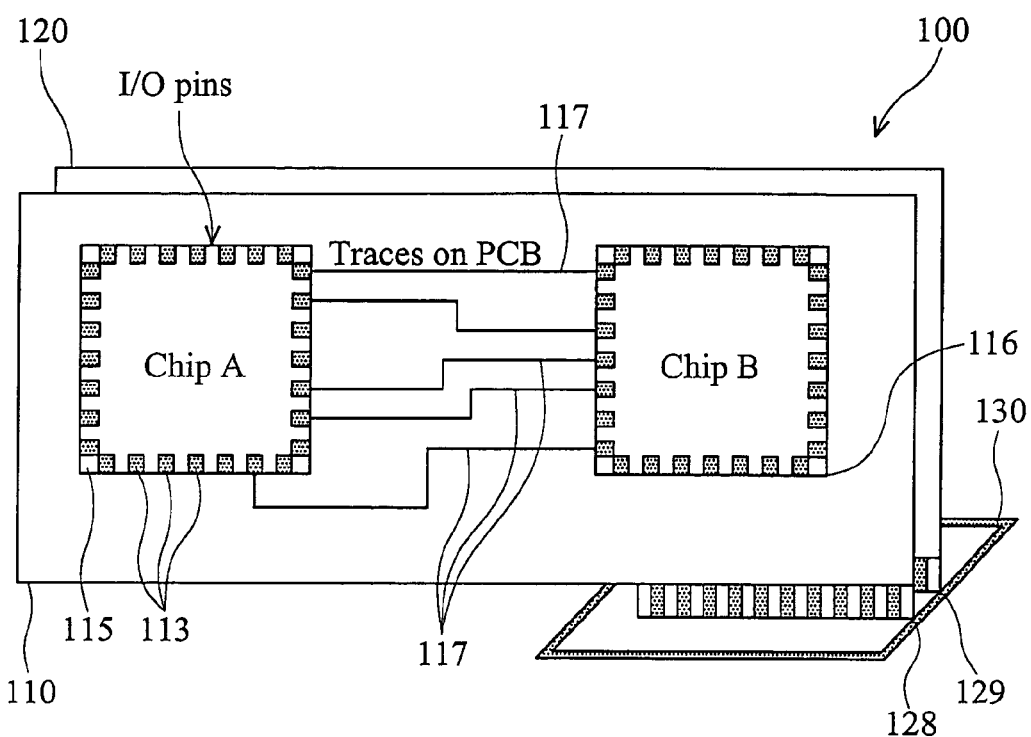
FIG. 1 is a schematic representation of a conventional inter-chip communication.

FIG. 1 is a schematic representation of a conventional inter-chip communication. Referring to FIG. 1, microelectronic package 100 is shown to include printer circuit boards ("PCB") 110 and 120 mounted on chassis 130 through connection ports 128 and 129, respectively. PCB 110 includes chips A 115 and Chip B 116. Each of the Chip A or Chip B may include one or more microelectronic circuits integrated therein (not shown). Each of Chip A and Chip B includes a plurality of I/O pins for communicating with other electronic components. For improved efficiency, the conventional systems require that I/O pins communicate in parallel. The microelectronic circuits of Chip A communicate with the microelectronic circuits of Chip B via traces 117 formed on the PCB. Traces 117 may include vias or trenches. Although not specifically shown, PCB 120 similarly includes one or more microchips.

Figure 2:
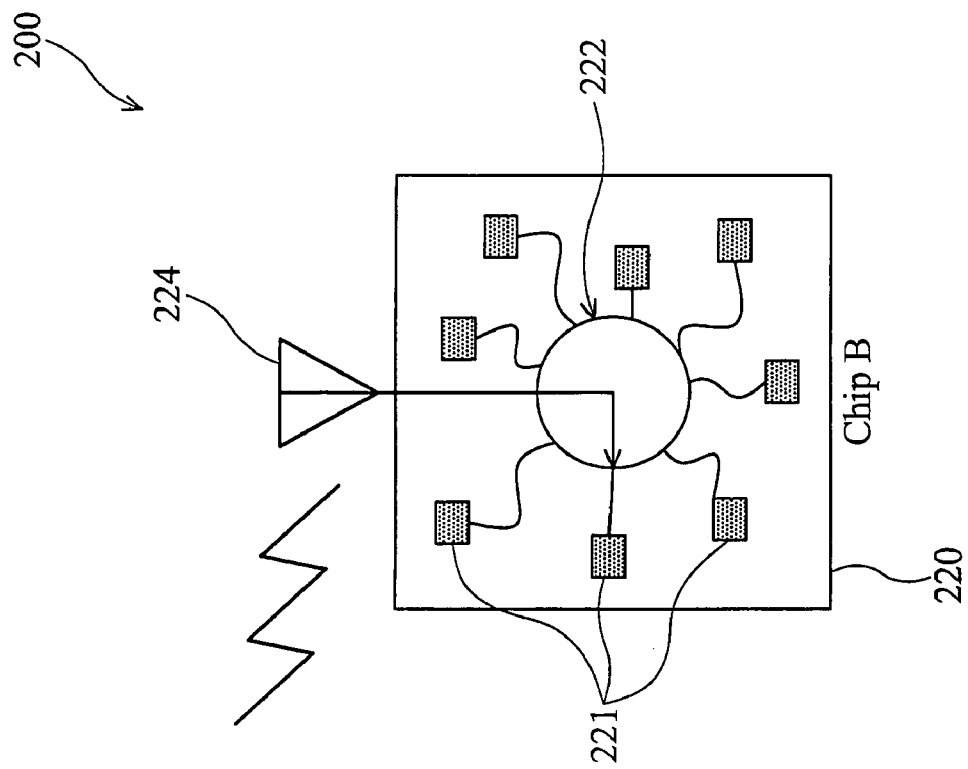
FIG. 2 is a schematic representation of a inter-chip communication according to one embodiment of the disclosure.
Figure 2:
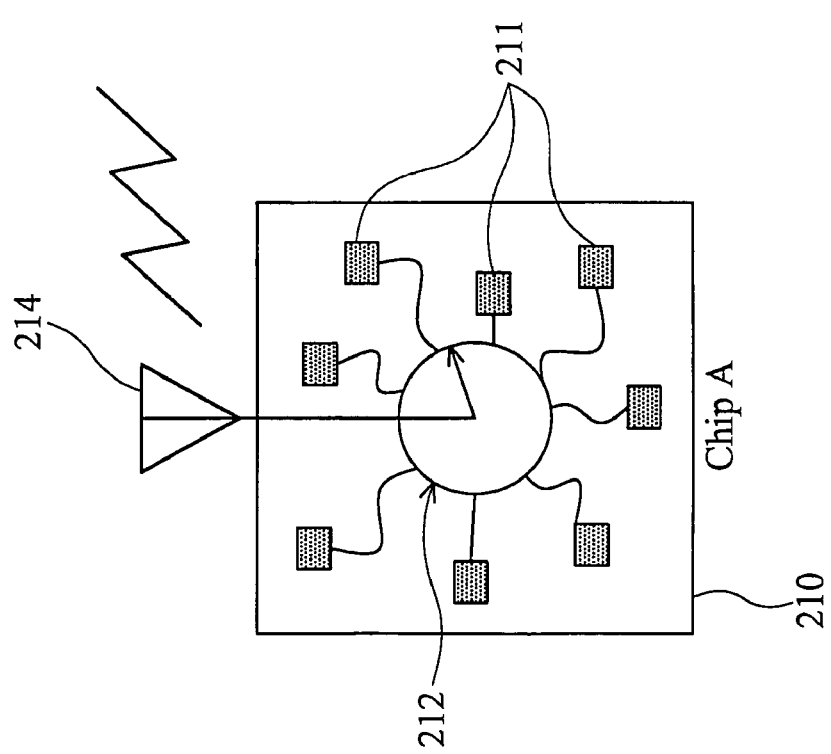

FIG. 2 is a schematic representation of a inter-chip communication according to one embodiment of the disclosure. Referring to FIG. 2, system 200 may comprise a microelectronic package with Chip A 210 and Chip B 220. Chip A may include nodes 211 and Chip B may include nodes 221. Each node can represent an IC circuit; alternatively, each node can represent one or more I/O port associated with the respective microchip. As can be seen from FIG. 2 each of Chip A and Chip B communicates with each other through RF signal communication. In other words, other than a power and/or a ground port, each of Chip A and Chip B is void of external electrical connection or traces on PCB. Instead, communication between Chip A and Chip is implemented by using non-capacitive coupling using a relatively low transmission power.

In the embodiment of FIG. 2, each of Chip A and Chip B is equipped with an integrated radio transmission circuit, identified as 212 and 222, respectively. The transmission circuit can be adapted work in simplex or duplex and as a transceiver. While transmission circuits 212 and 222 are shown integrated with the respective microchip, the disclosure is not limited thereto. Chip A and Chip B are also shown to have antenna 214 and 224, respectively. Antenna 214 and 224 can be conventional antenna used with similar devices. In one embodiment, the antenna may be implemented on the package level.

In one embodiment, transmission circuits 212 and 222 are configured to operate with a communication protocol (interchangeably, RF Macro). The communication protocol can be a conventional protocol such as TCP/IP. In one embodiment, the protocol is configured to receive communication signals from a plurality of I/O ports as parallel signal (optionally, as massively parallel signals), encode each signal with the addresses of the source and the destination ports, and prepare the message for transmission as a serial signal. The communication protocol may also multiplex (MUX) several signals from several I/O ports or from several microprocessors into a serial signal. Finally, the protocol may use any of the conventional encoding techniques for encoding the message prior to transmission. The encoded signal can be directed to antenna circuit 212 for transmission.

In an exemplary method according to one embodiment of the disclosure, inter-chip or inter-package communication is implemented by providing a first integrated circuit formed on a first die and a second integrated circuit formed on a second die. The first and the second die can be part of the same PCB or they can be formed on different PCBs of the same electronic device. In one embodiment, the transmitting and receiving devices are within one meter of each other. Each of the first and the second integrated circuits can be configured with a transmitter/receiver for RF communication and each can be programmed with a communication protocol adapted for inter-die communication.

During operation, transmission circuit 212 of Chip A 210 and the RF macro continuously scan and collect data from all of the I/O ports to which it is coupled. Each I/O port can be coded with an identifier address identifying the I/O port number, the microprocessor identifier or the PCB identifier. The signals are typically provided as parallel signals. Upon receipt of data, the RF macro prepares and encode the data for transmission, typically by translating the parallel signal with a serial signal of higher frequency. Encoding may entail formatting a serial message having a plurality of payloads associated with different source/destination addresses and directing the data to the antenna for transmission. Upon receipt of the message, a receiving antenna (e.g., antenna 224 associated with Chip B 220) may de-multiplex (DE-MUX) and decode the message prior to directing the data to the intended I/O ports.

According to one embodiment of the disclosure, the receiving Chip B 220 will screen the incoming data to identify the destination address. If the destination address matches its own, decoding procedure will be performed and the data will be sent to the appropriate I/O port. While capacitive coupling can be used for signal transfer, in a preferred embodiment the disclosure relates to using non-capacitive coupling between the transmitting and the receiving devices. Using non-capacitive coupling is particularly advantageous since there is no limitation to the orientation or location of I/O ports as is typical of capacitive coupling. That is because the capacitive coupling method requires capacitors between tow connecting I/O ports, so they have to be placed very close in order to enhance the coupling effect.

While the disclosure has been described in relation to certain exemplary embodiments presented herein, it should be noted that the principles of the disclosure are not limited thereto and include any modification, permutation or variation to the embodiments disclosed herein.

What is claimed is:

1. A method of communicating between a first integrated circuit formed on a first die and a second integrated circuit formed on a second die, the method comprising:

placing the first die in a microelectronic package adapted to receive an electronic circuit, the first integrated circuit configured with a transmitter/receiver for RF communication;

positioning the second die in the microelectronic package proximal to the first, the second integrated circuit configured with a transmitter/receiver for RF communication;

programming each of the first and the second die with a communication protocol adapted for inter-die communication; and establishing an RF communication between the first and the second integrated circuits using the communication protocol, wherein the RF communication defines a non capacitive-coupling of the first and the second die, wherein the step of establishing RF communication further comprises scanning all of the I/O ports of a transmitting microprocessor and translating a parallel signal output from the transmitting microprocessor to a serial signal for RF transmission.

2. The method of claim 1, wherein each of the first die and the second die is void of external electrical connection other than at least one of power and ground.

3. The method of claim 1, wherein the protocol is TPC/IP.

4. The method of claim 1, wherein each of the first and the second integrated circuit further comprises a plurality of I/O ports.

5. The method of claim 4, wherein each I/O port is identified with an address and each I/O port transmits data through the transmitter/receiver.

6. The method of claim 5, wherein the second die receives serial data transmitted from the plurality of I/O ports of the first die and, using the protocol, translates and directs the serial signal into a parallel signal addressed to the appropriate I/O ports of the second die.

7. An inter-chip communication system comprising:

a first die having a first microprocessor with a plurality of non-contact ports and a first RF communication circuit integrated therein; and a second die having a second microprocessor with a plurality of non-contact ports and a second RF communication circuit integrated therein;

wherein at least one of the first and second RF communication circuits is configured with an RF communication protocol adapted to receive data from each of the non-contact ports in parallel and translate the data to a serial RF communication signal; and wherein the RF communication between the first and the second integrated circuits using the communication protocol defines a non capacitive-coupling of the first and the second die.

8. The system of claim 7, wherein first die or the second die is void of external electrical connection other than at least one of power and ground connection.

9. The system of claim 7, wherein the protocol is TPC/IP.

10. The system of claim 7, wherein each plurality of I/O ports is adapted for parallel communication.

11. The system of claim 7, wherein each of the plurality of I/O port is identified with an address and transmits data through the transmitter/receiver.

12. The system of claim 11, wherein the protocol is adapted to receive data in parallel from the plurality of I/O ports and configure said parallel data into a serial signal with higher frequency.

13. A microprocessor adapted for wireless communication with a second microprocessor in a microelectronic package, comprising:

a die having embedded thereon a microprocessor circuit, the microprocessor circuit defining at least one electronic circuit having a plurality of I/O ports for parallel communication, the microprocessor circuit void of any external electrical connection other than at least one of power and ground; and a communication circuit for wireless communication of electrical signals from the microprocessor, the communication circuit configured with a communication protocol adapted to collect communication signals from the plurality of I/O ports in parallel and provide a serial signal for wireless transmission.

14. The microprocessor of claim 13, wherein the wireless communication with another microprocessor defines a non-capacitive coupling.

15. The microprocessor of claim 13, wherein the communication protocol is further adapted to identify the communication signal from each of the plurality of I/O ports with an appropriate segment of the serial signal.

16. The microprocessor of claim 13, wherein the communication circuit is further configured to receive a signal from the second microprocessor.

17. The microprocessor of claim 16, wherein the communication protocol is further adapted to receive the signal from the second microprocessor and direct a portion of the received signal to each of the intended plurality of I/O ports in parallel.

18. The microprocessor of claim 13, wherein the wireless transmission is an RF communication.

19. The microprocessor of claim 13, wherein the communication protocol is configured to multiplex, the communication signal prior to transmission.

20. A method of communicating between a first integrated circuit formed on a first die and a second integrated circuit formed on a second die, the method comprising:

placing the first die in a microelectronic package adapted to receive an electronic circuit, the first integrated circuit configured with a transmitter/receiver for RF communication, wherein the first integrated circuit includes a plurality of I/O ports each identified with an address and configured to transmit data through the transmitter/receiver;

positioning the second die in the microelectronic package proximal to the first, the second integrated circuit configured with a transmitter/receiver for RF communication, wherein the second integrated circuit includes a plurality of I/O ports each identified with an address and configured to transmit data through the transmitter/receiver;

programming each of the first and the second die, with a communication protocol adapted for inter-die communication; and establishing an RF communication between the first and the second integrated circuits using the communication protocol, wherein the RF communication defines a non-capacitive coupling of the first and the second die, and wherein the second die receives serial data transmitted from the plurality of I/O ports of the first die, using the communication protocol, and translates and directs the serial signal into a parallel signal addressed to the appropriate I/O ports of the second die.

* * * * *